United States Patent
Beij et al.

(10) Patent No.: US 10,619,328 B2
(45) Date of Patent: Apr. 14, 2020

(54) PANFLUTE OVERFLOW SYSTEM

(71) Applicant: IHC Holland IE B.V., Sliedrecht (NL)

(72) Inventors: Wouter Beij, Zoetermeer (NL); Bram Adrianus Waltherus van Spaendonk, Prinsenbeek (NL)

(73) Assignee: IHC Holland IE B.V., Sliedrecht (NL)

( * ) Notice: Subject to any disclaimer, the term of this patent is extended or adjusted under 35 U.S.C. 154(b) by 33 days.

(21) Appl. No.: 15/778,692

(22) PCT Filed: Nov. 23, 2016

(86) PCT No.: PCT/NL2016/050821
§ 371 (c)(1),
(2) Date: May 24, 2018

(87) PCT Pub. No.: WO2017/099583
PCT Pub. Date: Jun. 15, 2017

(65) Prior Publication Data
US 2018/0355582 A1    Dec. 13, 2018

(30) Foreign Application Priority Data

Nov. 26, 2015 (NL) ..................... 2015858

(51) Int. Cl.
| | |
|---|---|
| *E02F 7/04* | (2006.01) |
| *E02F 7/06* | (2006.01) |
| *B01D 21/24* | (2006.01) |
| *E02F 3/94* | (2006.01) |

(52) U.S. Cl.
CPC ............ *E02F 7/04* (2013.01); *B01D 21/2444* (2013.01); *E02F 3/945* (2013.01); *E02F 7/065* (2013.01)

(58) Field of Classification Search
CPC ..... E02F 3/88; E02F 3/90; E02F 3/945; E02F 7/04; E02F 7/065; B01D 21/10; B01D 21/2444
USPC .......... 210/170.04, 540; 37/317, 335; 299/9; 137/236.1
See application file for complete search history.

(56) References Cited

U.S. PATENT DOCUMENTS

| | | | | |
|---|---|---|---|---|
| 3,862,033 A | * | 1/1975 | Rozkydalek, III | B01D 21/10 210/802 |
| 3,975,842 A | * | 8/1976 | Andreae | E02F 7/04 299/9 |
| 4,149,480 A | * | 4/1979 | Brakel | E02F 7/065 114/26 |
| 4,206,057 A | * | 6/1980 | Nieuwendijk | E02F 7/04 210/523 |
| 4,245,932 A | * | 1/1981 | van Zeggelaar | E02F 7/065 406/197 |

(Continued)

FOREIGN PATENT DOCUMENTS

| | | |
|---|---|---|
| BE | 1005478 A3 | 8/1993 |
| EP | 0642817 A1 | 3/1995 |

(Continued)

*Primary Examiner* — Christopher Upton
(74) *Attorney, Agent, or Firm* — N.V. Nederlandsch Octrooibureau; Catherine A. Shultz; Katelyn J. Bernier (57) ABSTRACT

An overflow system for a hopper dredger includes an overflow tube; and a plurality of canals adjacent and substantially parallel to the overflow tube. The plurality of canals have inlets at different heights for taking in head water from the hopper. The plurality of canals fluidly connect to the overflow tube at a point downstream from the inlets.

20 Claims, 4 Drawing Sheets

(56) References Cited

U.S. PATENT DOCUMENTS

| | | | |
|---|---|---|---|
| 4,374,504 A | 2/1983 | Loevendie | |
| 5,584,993 A | 12/1996 | Van Der Schrieck | |
| 2011/0024282 A1* | 2/2011 | Meintjes | B01D 21/10 203/40 |
| 2011/0278212 A1* | 11/2011 | Tyner | B01D 21/2444 210/540 |
| 2014/0377036 A1* | 12/2014 | Stam | B01D 21/2444 414/143.2 |
| 2015/0040813 A1* | 2/2015 | Kik | E02F 7/04 114/183 R |
| 2017/0275849 A1* | 9/2017 | Koevoets | E02F 7/04 |

FOREIGN PATENT DOCUMENTS

| | | | |
|---|---|---|---|
| JP | 62-164922 A | | 7/1987 |
| JP | 2003-2285 A | | 1/2003 |
| NL | 9201853 | | 5/1993 |
| NL | 1003317 | * | 12/1997 |
| WO | 9212936 A1 | | 8/1992 |

* cited by examiner

PANFLUTE OVERFLOW SYSTEM

BACKGROUND

Trailing suction hopper dredgers ("TSHD") are vessels which can be used to dredge at sea or in open water. TSHD's typically use a suction tube, one end of which can be lowered to the seabed and used to suck up solids such as sand, sludge, silt or sediment, mixed with water. The lower end of this suction tube can be provided with a suction head or a drag head. The solid material mixed with water is pumped through the suction tube into a hopper of the dredging vessel. The mixture is reduced in speed when in the dredger hopper, and this speed reduction allows for the settling of components suspended in the mixture. Excess water is then overflowed out of the hopper through an overflow to allow for more load capacity within the TSHD.

Water from the hopper flows into the overflow through an entry disk or directly into the overflow from the top. This overflow volume is then released below the water surface outside of the dredging vessel. Due to the generally vertical flow orientation of the overflow, the cross-sectional area of the overflow and the velocity, the overflow volume typically mixes with air. This mixture can reduce the specific weight of the mixture, causing the overflow mixture to stick to the ship's hull and the boundary flow of the underwater vessel. This mixture, which may also contain lighter particles which have not settled, and the interactions between the overflow volume released, the hull, propellers, speed of the vessel and currents; can form a plume in the wake of the dredging process. The settling of this mixture can then have an adverse effect on the local environment. The air in the flow also causes a resistance in the overflow, reducing the effective transport capacity of the overflow.

One method to combat this plume caused by suspended particles is disclosed in WO 2013/119107. A passive overflow device is used to drain away head water and flow it through a conduit to an outlet abutting the sea bottom to deliver the head water close to the sea bottom, thereby minimizing the influence on sea life. U.S. Pat. No. 3,975,842 discloses a system which also attempts to minimize the environmental effects by directing the overflow to the suction head to be used as the liquid supply for loosening the soil to be suctioned, thus forming a closed system where the overflow is recycled.

SUMMARY

According to a first aspect of the invention, an overflow system for a hopper dredger comprises an overflow tube; and a plurality of canals adjacent and substantially parallel to the overflow tube. The plurality of canals have inlets at different heights for taking in head water from the hopper. The plurality of canals fluidly connect to the overflow tube at a point downstream from the inlets.

Such an overflow system provides a simple system with few or no moving parts that can handle variations in fluid levels in hopper, overflowing liquid from the hopper while minimizing and/or eliminating air in the overflow. The flow initially into one or more canals provides for a controlling of the flow into a smaller space, and the connection fluidly downstream can allow for any air in the flow to escape through the overflow tube. As water levels rise or fall, a different number of canals are used, keeping capacity of the overflow in line with what is needed at the time. This can maximize capacity of the overflow system and reduce or eliminate turbidity and/or a plume upon exit of the overflow system, preventing environment damage from such a plume.

According to an embodiment, the plurality of canals at least partially surround the overflow tube. These canals can then form substantially parallel flow paths with the overflow tube before fluidly connecting.

According to an embodiment, each of the plurality of canals comprises an open top serving as an inlet for the canal. In other embodiments, the inlet can be positioned differently, for example, around the sides of the canal with a closed top and/or be a plurality of inlets.

According to an embodiment, the plurality of canals are positioned around the overflow tube in order from the canal with the highest positioned inlet to the canal with the lowest positioned inlet. These inlets can have a smooth transition from one to another (e.g., a slanted top) or could have level inlets at different positions. A smooth transition can help transition flow easily from one canal to the use of another (or one fewer) when liquid levels are rising or falling. Level inlets at different positions could be simpler to manufacture.

According to an embodiment, at least one of the plurality of canals varies in diameter and/or inlet size. Optionally, each of the plurality of canals varies in diameter and/or inlet size. Variations in diameter and/or inlet size allows for controlling of the flow into and through the canal. This can help to allow more or less flow into canal, control acceleration and/or velocity and other factors, ultimately allowing for minimizing the turbidity and/or air mixed in flow.

According to an embodiment, the overflow tube extends to overflow the head water taken in from the plurality of canals the overflow tube. The canals could be connected directly to the overflow tube for exiting the overflow system. Such a system allows for easy adaptation of past overflows to the use of canals, for example, by placing the canals inside the overflow tube of the past system. Alternately, canals could be connected to the overflow tube in another manner to flow liquid from canals into the overflow tube and ultimately to an outlet of the overflow system.

According to an embodiment, the overflow tube comprises an opening able to take in head water from the hopper and release air from the overflow system. This could be at a top of the overflow tube (e.g., an open top), around the sides or in another position. Optionally, there could be a plurality of openings.

According to an embodiment, the opening of the overflow tube is located at a higher position than the inlets of the plurality of canals. This allows for the opening to be used as an inlet for the overflow system only if all the canals are in use and liquid level is still too high. This keeps opening generally free for the letting out air from flow through the canals when not required for flow. This opening is also useful in emergency situations, for example, when liquid needs to be released from the hopper very quickly, the overflow tube and canals are all able to flow liquid through.

According to an embodiment, the plurality of canals fluidly connect to the overflow tube at an overflow channel. Optionally, the overflow channel is larger in cross-section than the overflow tube. Further optionally, the overflow channel is substantially equal in cross-section to the sum of the cross-sections of the plurality of canals and the overflow tube. By connecting the plurality of canals to the overflow tube at an overflow channel, flow and therefore turbidity can be better controlled in the mixture. When the overflow channel is larger and/or substantially equal in cross-section to the sum of the cross-sections of the plurality of canals and the overflow tube, the flow through each canal can join together and release any air in flow through overflow tube.

According to an embodiment, each of the plurality of canals have a smaller cross-sectional area than the cross-sectional area of the overflow tube. This allow for a controlled, smaller flow area, thereby keeping a lower speed flow to reduce or eliminate turbidity and any resulting plume.

According to an embodiment, at least one of the canals reduces in cross-section going downstream from the inlet. This reduction in cross-section of the canal can allow for slowing down of flow when approaching fluid connection with the flow channel and/or overflow tube, thereby helping to eliminate the turbidity and mixing which can cause a plume upon exit of the overflow system. Optionally, the overflow tube expands in cross-section while the at least one canal reduces in cross-section. Further optionally, the reduction in cross-section of the at least one canal corresponds to the expansion in cross-section to the overflow tube. This can allow for a standard outer package of the overflow system and for helping to control the flow through the overflow system. Keeping a standard outer diameter can allow for adapting past overflow systems to use the plurality of canals, for example, placing a plurality of canals which form a new central overflow inside past systems and setting the cross-sectional areas, inlets and inlet heights accordingly.

According to an embodiment, a vessel comprises the overflow system of any of the preceding claims. Optionally, the overflow system extends to a bottom of the vessel.

According to an embodiment, the overflow system extends beyond a bottom of the vessel. This can help to release the overflow at a point away from the hull of the vessel, which can help to minimize or eliminate a plume.

According to a second aspect of the invention, an overflow system add-on for an overflow system comprising an overflow tube with a pipe in a hopper comprises a plurality of canals, each canal with an inlet at a different height. The plurality of canals are connectable adjacent to or inside of the overflow tube such that the inlets of the plurality of canals will sit at a lower level than an inlet of the overflow tube and that the plurality of canals fluidly connect to the overflow tube downstream from the inlets. Such a system can adapt a current or existing overflow tube to be able to respond progressively or regressively in capacity for changes in liquid levels in the hopper.

According to an embodiment, each of the plurality of canals comprises an open top serving as an inlet for the canal.

According to an embodiment, at least one of the plurality of canals varies in diameter and/or inlet size. Optionally, each of the plurality of canals varies in diameter and/or inlet size. The variations in diameter and/or inlet size can help to control flow into and through canals to achieve a desired flow rate, and thereby help to appropriately respond to different needs in capacity while minimizing or eliminating flow patterns which can lead to a plume exiting the overflow system.

According to an embodiment, each of the plurality of canals have a smaller cross-sectional area than the cross-sectional area of the overflow tube. This can allow for canals to be used for normal, controlled overflow and the overflow tube to only be used in exceptional circumstances, for example when emergency overflow is needed.

According to an embodiment, the plurality of canals are connectable inside the overflow tube and form a new central overflow tube with a smaller cross-sectional area within the plurality of canals. Such a system can allow for easy adaptation of past overflow systems and/or tubes.

According to a third aspect of the invention, a method of forming an overflow system comprises connecting a plurality of canals adjacent to an overflow tube in a hopper; and fluidly connecting the plurality of canals to the overflow tube downstream from inlets such that liquid entering inlets of the plurality of canals will be transported to the overflow tube downstream from the inlets, wherein the plurality of canals are sized and/or positioned such that the respective inlet to each canal is at a different height. Such a method can form an overflow system that can respond quickly and easily respond to different needs for capacity in the overflow system while maintaining control on the flow into and through the overflow system to reduce or eliminate turbidity, mixing and other things that can lead to a plume upon exit.

According to an embodiment, the step of connecting a plurality of canals adjacent to an overflow tube in a hopper comprises connecting a plurality of canals at least partially around the overflow tube. This could be outside or inside the overflow tube.

According to a further aspect of the invention, a method of flowing liquid through an overflow system comprises flowing the head water from the hopper through at least one inlet of a canal in an overflow system; and flowing the head water from at least one canal to a flow channel which fluidly connects to the plurality of canals and to the overflow tube. The overflow system comprises an overflow tube and a plurality of canals adjacent to overflow tube, each of the plurality of canals comprising an inlet at a different height than the inlets of the other of the plurality of canals. Such a method can allow quick and easily response to different needs for capacity in the overflow system while maintaining control on the flow into and through the overflow system to reduce or eliminate turbidity, mixing and other things that can lead to a plume upon exit.

BRIEF DESCRIPTION OF THE DRAWINGS

FIG. 2B illustrates a perspective view of parts of the overflow system of FIG. 2a.

DETAILED DESCRIPTION

Figure 1:
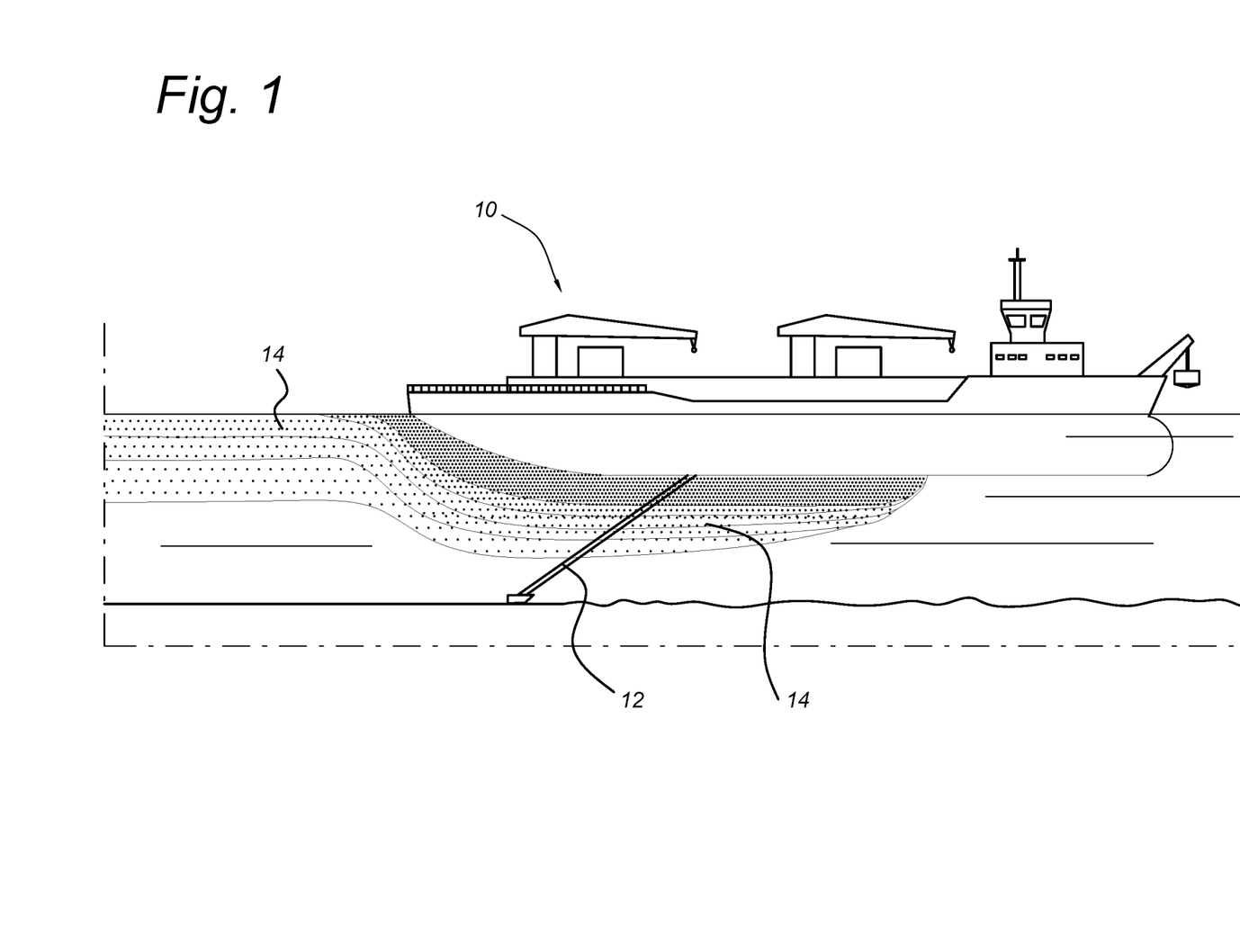
FIG. 1 illustrates a trailing suction hopper dredger during a dredging operation.

FIG. 1 illustrates a trailing suction hopper dredger ("TSHD") 10 during a dredging operation. Trailing suction hopper dredger 10 is suctioning a mixture of water and solid particles through suction tube 12. This mixture is then transported to a hopper in THSD 10 (not shown). Excess liquid in the hopper is overflowed, and plume 14 forms due to mixing of air with the overflow, the vertical orientation of the overflow, and the speed and the general flow causing the overflow water to mix with air.

Plume 14 can have an adverse impact on local marine biotope, as it reduces the entrance of light into the water body. Additionally, in some cases, the settling particles smother bottom life, and the suspensions can reduce the ability for microorganisms to develop. The bubbles in the flow also cause a resistance in the overflow, reducing the effective transport capacity of the overflow. Forming an overflow which is adjustable to control the flow of head water into and through the overflow can help to reduce turbidity and the mixing of air into the head water, thus reducing or eliminating the plume 14 exiting vessel 10.

Figure 2A:
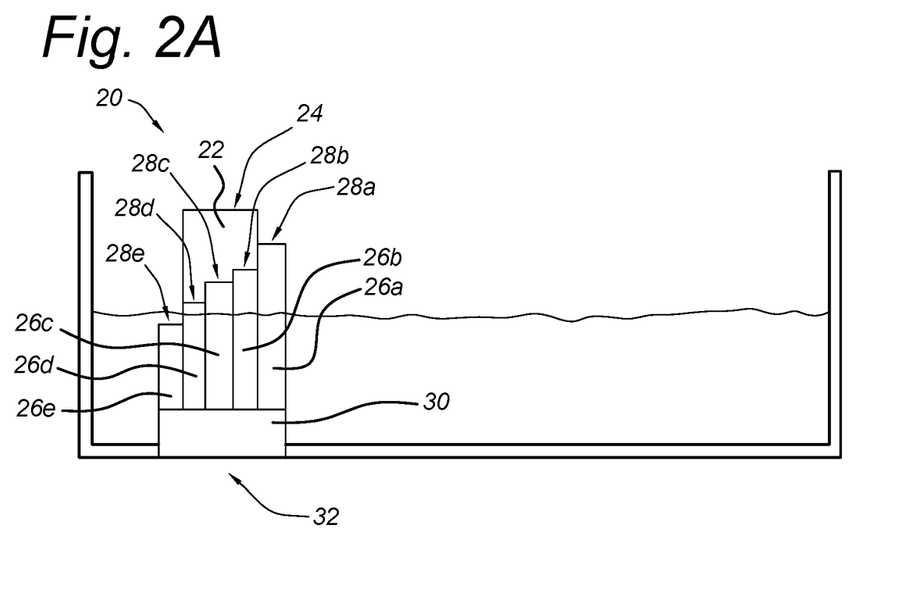
FIG. 2A illustrates side view of an overflow system with an overflow tube and a plurality of canals.
Figure 2B:
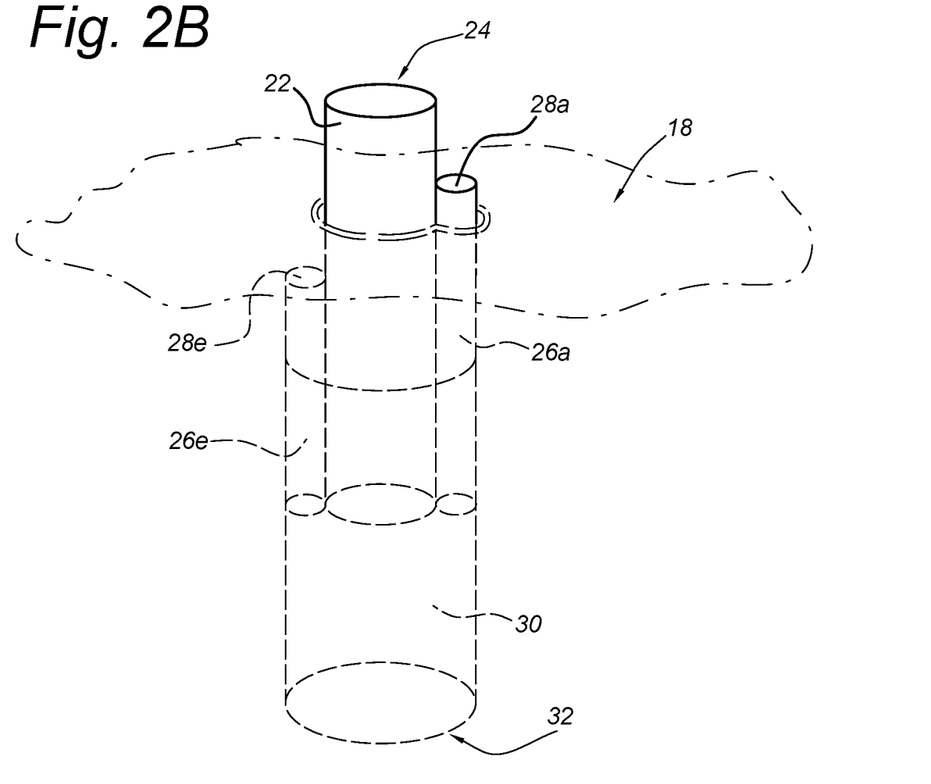
Figure 2C:
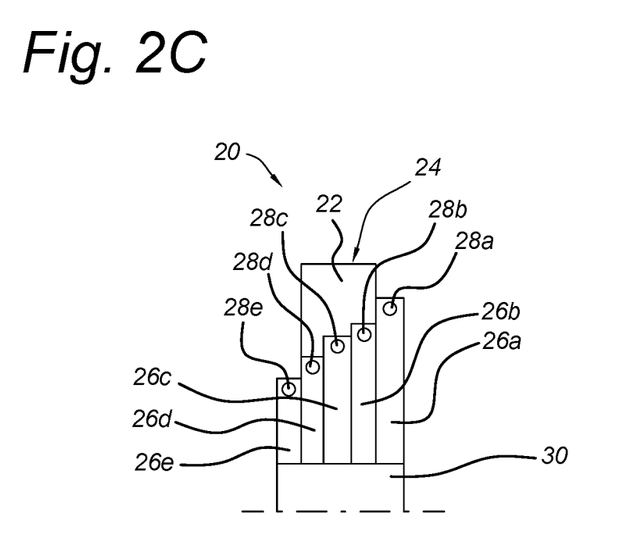
FIG. 2C illustrates a side view of an alternative embodiment of the canals for an overflow system.

FIG. 2A illustrates a side view of a dredger hopper 18 or a loading space within a TSHD, and overflow system 20 which can transport head water from the hopper 18 back into a liquid body. FIG. 2B illustrates a see through perspective view of overflow system 20, with some canals 26 not shown for ease of viewing. FIG. 2C illustrates a side view of an alternative embodiment of the canals 26a-26e for overflow system 20. Overflow system 20 includes overflow tube 22 with opening 24, canals 26a-26e with inlets 28a-28e, flow channel 30 and fluid outlet 32.

Overflow system 20 has five canals 26a-26e shown in this embodiment, but could include more or fewer canals (for example, 8 total extending all around overflow tube 22) in this or other embodiments. Canals 26a-26e can extend to different heights in hopper 18 and/or can have different cross-sectional areas and/or inlets 28a-28e. Each canal 26 is open at the top, which acts as an inlet 28 for each canal 26. In other embodiments, such as that shown in FIG. 2C, each canal 26a-26e may be closed at the top, and have one or more inlets 28a-28e on a side.

Overflow tube 22 can sit adjacent to canals 26a-26e, and canals 26a-26e can extend at least partially around overflow tube to allow flow substantially parallel to that of overflow tube. In the embodiment shown, canals 26a-26e are in order of tallest to shortest extending around overflow tube 22. This sets inlets 28a-28e in order of tallest height to shortest height extending around overflow tube 22. Downstream from inlets 28a-28e, canals 26a-26e fluidly connect to overflow tube 22, at flow channel 30. As can be seen in FIG. 2B, this is a downstream section into which overflow tube 22 and canals 26a-26e flow. In this embodiment, it is shown to be about equal in cross-section to that of canals 26a-26e and overflow tube 22 combined, though in other embodiments the cross-section could be less, for example, flow channel 30 could be just an extension of overflow tube 22 or more.

Opening 24 in overflow tube 22 is at a top of overflow tube 22, and typically sits at a position higher than any of inlets 28a-28e of canals 26a-26e. This position is also set to be typically higher than an expected liquid level in hopper 18. This allows opening 24 to be used as an inlet for emergency draining when liquid needs to removed rapidly. Opening 24 can also function as an outlet, allowing any trapped air bubbles in the overflow to escape through overflow tube 22. While opening 24 is shown as an opening at the top of overflow tube 22 in FIG. 2A, one or more openings functioning as an inlet and/or outlet could be used and could be sized and/or positioned differently than shown, for example, radially oriented around the side of overflow tube 22.

Outlet 32 of overflow system 10 could be at a bottom of vessel 10, at a point below vessel 10 or at another point. Outlet 32 must be below a minimum fluid level in the overflow system 20 so as to avoid additional introduction of air bubbles into the overflow mixture.

In operation, as discussed above, TSHD suctions a mixture of liquid and fractions, and deposits that mixture into dredger hopper 18. The head water in dredger hopper 18 continues to rise as particles and fractions settle. When the head water reaches the level of lowest canal inlet 26e, the head water enters overflow system 20 through inlet 26e. The head water flows through canal 26e into flow channel 30 and finally to outlet 32. As water in hopper 18 rises, it comes to a level where the water level allows for flow into inlets of more of canals 26a-26e. This allows for sufficient intake of head water for proper drainage in hopper 18 while controlling the amount of overflow and the flow into flow channel 30 and through overflow system 20.

Each canal 26a-26e can handle a certain amount of flow based on its inlet and cross-sectional area, and when flow rises, one or more additional canals 26a-26e are used, thereby giving overflow system 20 more capacity through reaching an additional inlet 28a-28e. Once flow reaches through one or more canals 26a-26e channel 30 downstream from inlets 28a-28e, mixture velocity is low and any air in the flow can rise and leave through overflow pipe 22 opening 24, allowing mostly or only liquid to flow through flow channel 30 to outlet 32.

Overflow system 20 works to control the intake, velocity and flow of head water into and through overflow system 20 to reduce or eliminate air in the mixture, and thereby reduce or eliminate any plume exiting the vessel as a result of this air. This is done with a simple self-regulating system which has few or no moving parts. The plurality of canals 26a-26e with inlets 28a-28e adjacent to an overflow tube 22 are each set with a certain inlet location and flow area to provide an overflow system which can respond progressively and regressively in capacity for overflow system 22. Because canals 26a-26e are set parts, they could be added to existing overflow systems, connecting downstream to an existing overflow tube, providing existing overflow tubes with the ability to vary capacity based on liquid levels in hopper 18.

This system with different inlet 28a-28e heights to allow flow into overflow system 20 handles variations in fluid levels in hopper 18 and thus the total flow in overflow system with a simple design with few or no moving parts. This can lead to a more reliable system and a longer lifespan of overflow system 20 which can handle large fluctuations in needed capacity for overflow liquid while minimizing and/or eliminating air in the overflow by allowing escape through overflow tube 22 opening 24. As canals 26a-26e are relatively small in cross-section, the larger wall friction from the plurality of small canals 26a-26e can also help to control the flow. This ensures a cleaner overflow liquid to reduce or avoid turbidity and/or a plume upon exit of flow from overflow system 20, and maximized capacity of overflow system 20.

Figure 3:
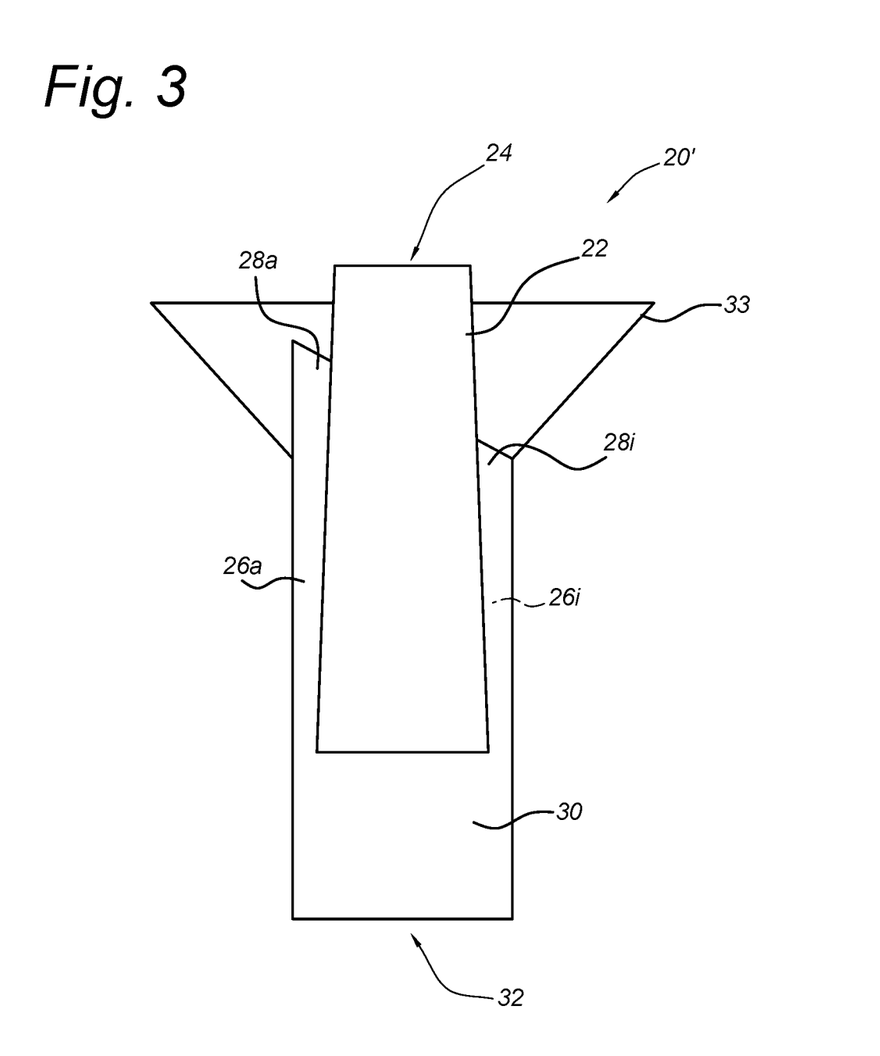
FIG. 3 illustrates a cross-sectional view of second embodiment of an overflow system.

FIG. 3 illustrates a cross-sectional view of second embodiment of an overflow system 20'. Parts are labelled similarly as in FIGS. 2A-2B. Overflow system 20' includes overflow tube 22 with opening 24, canals 26a, 26i with inlets 28a, 28i, flow channel 30, fluid outlet 32 and cone 33.

This embodiment is set up, connected and functions very similar to overflow system 20 in FIGS. 2A-2C, only overflow system 20' includes a much larger amount of canals, 16 in total. Each canal 26 reduces in cross-section from its inlet 28 to the point at which it connects to flow channel 30. Additionally, canals are shaped to have a smoother transition of inlet 28 levels, thereby not allowing for additional build-up of liquid and/or pressure when inlets 28 of canals are spaced out further.

Cone 33 is an optional feature of overflow systems, and can help to control flow into overflow system 20'.

In this embodiment, the reduction in cross-section of canals 26 is coupled with an increase in cross-section of overflow tube 22, such that the overall total cross-section of the overflow remains constant. By reducing the cross-sectional area of canals (as shown in the cross-sections of 26a, 26i) from inlets to the point at which they enter flow channel 30, acceleration and flow can be slowed even when releasing air in the mixture, ensuring a mostly or only liquid to flow through flow channel 30 to outlet 32. This further helps to reduce or eliminate any plume generated by overflow liquid.

Overflow system 20' shows a simple way which could be used to adapt existing overflow tubes to the use of canals 26 and a central overflow tube. Canals 26 and central overflow tube 22 can simply fit within the existing overflow perimeter to provide the benefits of overflow system 20', easily handling variations in fluid levels in hopper 18 and thus the total flow in overflow system with a simple design to slow down flow and reduce or eliminate any plume from overflow.

While canals 26a-26f are shown cylindrical and placed around overflow tube 22, canals can be a different shape and/or configuration to assist in forming a plurality of flow channels with inlets at different level and with a desired cross-sectional area and inlet. For example, canals can be shaped to form a cylinder together around the outer circumference or could be placed inside an overflow tube 22 (ensuring that overflow tube inlet 24 is raised to be above canal inlets) to form flow channels within overflow tube. This can bring about the same advantages, and may be easier when adapting existing systems to using canals. Further components can be combined with the overflow system, such as filters and/or other existing means, to further reduce plumes. These can be placed anywhere within the overflow system, including in the canals and/or the central overflow tube.

While the term head water is used for the mixture entering and flowing through overflow system, this could be liquid and/or a combination of liquid and particles which were dredged and remain suspended.

While the system is referenced as having no moving parts, this is in relation of movement between the canal inlets and the overflow inlets. An additional system could be in use for moving part or the whole overflow system, for example, allowing the overflow tube inlet 24 and canal inlets 28 move to generally follow the water level in the hopper.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. An overflow system for a hopper dredger, the overflow system comprising:
   an overflow tube; and
   a plurality of canals adjacent and substantially parallel to the overflow tube, the plurality of canals having inlets at different heights for taking in head water from the hopper; wherein the plurality of canals fluidly connect to the overflow tube at a point downstream from all of the inlets.

2. The overflow system of claim 1, wherein the plurality of canals at least partially surround the overflow tube, and are positioned around the overflow tube in order from the canal with the highest positioned inlet to the canal with the lowest positioned inlet.

3. The overflow system of claim 1, wherein each of the plurality of canals comprises an open top serving as an inlet for the canal.

4. The overflow system of claim 1, wherein at least one of the plurality of canals varies in diameter and/or inlet size.

5. The overflow system of claim 1, wherein the overflow tube comprises an opening able to take in head water from the hopper and release air from the overflow system.

6. The overflow system of claim 5, wherein the opening of the overflow tube is located at a higher position than the inlets of the plurality of canals.

7. The overflow system of claim 1, wherein the plurality of canals fluidly connect to the overflow tube at an overflow channel, wherein the overflow channel is larger in cross-section than the overflow tube.

8. The overflow system of claim 7, wherein the overflow channel is substantially equal in cross-section to the sum of the cross-sections of the plurality of canals and the overflow tube.

9. The overflow system of claim 1, wherein each of the plurality of canals have a smaller cross-sectional area than the cross-sectional area of the overflow tube.

10. The overflow system of claim 1, wherein at least one of the canals reduces in cross-section going downstream from the inlet.

11. The overflow system of claim 10, wherein the overflow tube expands in cross-section while the at least one canal reduces in cross-section.

12. The overflow system of claim 11, wherein the reduction in cross-section of the at least one canal corresponds to the expansion in cross-section to the overflow tube.

13. A vessel comprising the overflow system of claim 1, wherein the overflow system extends at least to a bottom of the vessel.

14. An overflow system add-on for an overflow system comprising an overflow tube with a pipe in a hopper, the add-on comprising:
   a plurality of canals, each canal with an inlet at a different height, connectable adjacent to or inside of the overflow tube such that the inlets of the plurality of canals will sit at a lower level than an inlet of the overflow tube and that the plurality of canals fluidly connect to the overflow tube downstream from all of the inlets.

15. The overflow system of claim 14, wherein each of the plurality of canals comprises an open top serving as an inlet for the canal.

16. The overflow system of claim 14, wherein at least one of the plurality of canals varies in diameter and/or inlet size.

17. The overflow system of claim 14, wherein each of the plurality of canals have a smaller cross-sectional area than the cross-sectional area of the overflow tube.

18. The overflow system of claim 14, wherein the plurality of canals are connectable inside the overflow tube and form a new central overflow tube with a smaller cross-sectional area within the plurality of canals.

19. A method of forming an overflow system, the method comprising:
   connecting a plurality of canals adjacent to an overflow tube in a hopper; and
   fluidly connecting the plurality of canals to the overflow tube downstream from inlets such that liquid entering inlets of the plurality of canals will be transported to the overflow tube downstream from all of the inlets, wherein the plurality of canals are sized and/or positioned such that the respective inlet to each canal is at a different height.

20. The method of claim 19, wherein the step of connecting a plurality of canals adjacent to an overflow tube in a hopper comprises connecting a plurality of canals at least partially around the overflow tube.

* * * * *